United States Patent
Chen et al.

(10) Patent No.: US 12,368,276 B2
(45) Date of Patent: Jul. 22, 2025

(54) SEQUENTIAL-PULSE SINGLE-FREQUENCY LASER POWER AMPLIFICATION APPARATUS AND SEQUENCE CONTROLLABLE MULTI-LASER SYSTEM

(71) Applicant: National University of Defense Technology, Changsha (CN)

(72) Inventors: Ting Chen, Changsha (CN); Yi Xie, Changsha (CN); Wei Wu, Changsha (CN); Jie Zhang, Changsha (CN); Baoquan Ou, Changsha (CN); Pingxing Chen, Changsha (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 18/628,874

(22) Filed: Apr. 8, 2024

(65) Prior Publication Data
US 2024/0347996 A1    Oct. 17, 2024

(30) Foreign Application Priority Data
Apr. 13, 2023 (CN) .......................... 202310394910.1

(51) Int. Cl.
*H01S 3/10* (2006.01)
*H01S 3/00* (2006.01)
*H01S 3/23* (2006.01)

(52) U.S. Cl.
CPC .......... *H01S 3/0085* (2013.01); *H01S 3/1003* (2013.01); *H01S 3/10092* (2013.01); *H01S 3/2308* (2013.01)

(58) Field of Classification Search
CPC ......... H01S 3/2308–235; H01S 3/2375; H01S 3/1001; H01S 3/10084–10092; H01S 5/0656
See application file for complete search history.

(56) References Cited

U.S. PATENT DOCUMENTS

| | | | | |
|---|---|---|---|---|
| 4,752,931 A | * | 6/1988 | Dutcher | H01S 3/115 372/18 |
| 5,099,486 A | * | 3/1992 | Acharekar | H01S 3/10092 372/38.1 |

(Continued)

FOREIGN PATENT DOCUMENTS

| | | | | |
|---|---|---|---|---|
| CN | 109066274 A | * | 12/2018 | H01S 3/0078 |
| FR | 3029363 A1 | * | 6/2016 | H01S 3/0809 |

OTHER PUBLICATIONS

Schkolnik et al., "Generating 500 mW for Laser Cooling of Strontium Atoms by Injection Locking a High Power Laser Diode," Apr. 24, 2020, arXiv:2004.11732v1, 1-5. (Year: 2020).*

*Primary Examiner* — Joshua King
(74) *Attorney, Agent, or Firm* — Birchwood IP

(57) ABSTRACT

Provided is a sequential-pulse single-frequency laser power amplification apparatus, which comprises a sequence control unit for modulating and switching a source laser to output a primary laser, and a power amplification unit for amplifying the primary laser to output a secondary laser. Also provided is a sequence controllable multi-laser system comprising a plurality of single-frequency and/or multi-frequency laser power amplification apparatuses. This allows a single ultra-narrow linewidth laser device to meet the experimental requirements of multiple platforms in an atomic experiment, achieving high performance at low costs.

2 Claims, 7 Drawing Sheets

(56) References Cited

U.S. PATENT DOCUMENTS

| | | | | |
|---|---|---|---|---|
| 5,305,334 | A * | 4/1994 | Margalit | H01S 3/10092 |
| | | | | 372/15 |
| 5,974,060 | A * | 10/1999 | Byren | H01S 3/10092 |
| | | | | 372/19 |
| 6,266,351 | B1 * | 7/2001 | Burkhard | H03B 28/00 |
| | | | | 372/75 |
| 10,340,658 | B1 * | 7/2019 | Boyd | H05H 3/02 |
| 11,424,591 | B2 * | 8/2022 | Kurita | H01S 3/06754 |
| 11,619,861 | B1 * | 4/2023 | Cingoz | G02F 1/3558 |
| | | | | 359/328 |
| 2002/0064202 | A1 * | 5/2002 | Sandstrom | H01S 3/2366 |
| | | | | 372/55 |
| 2002/0071468 | A1 * | 6/2002 | Sandstrom | G03F 7/70041 |
| | | | | 372/57 |
| 2002/0085606 | A1 * | 7/2002 | Ness | G03F 7/70483 |
| | | | | 372/55 |
| 2003/0103534 | A1 * | 6/2003 | Braiman | H01S 5/4006 |
| | | | | 372/10 |
| 2009/0225795 | A1 * | 9/2009 | Park | H01S 5/4006 |
| | | | | 372/18 |
| 2010/0189136 | A1 * | 7/2010 | Gapontsev | H01S 3/2375 |
| | | | | 372/6 |
| 2021/0075191 | A1 * | 3/2021 | Enderlein | H01S 3/06754 |
| 2021/0273398 | A1 * | 9/2021 | Malcolm | H01S 3/10092 |

* cited by examiner

SEQUENTIAL-PULSE SINGLE-FREQUENCY LASER POWER AMPLIFICATION APPARATUS AND SEQUENCE CONTROLLABLE MULTI-LASER SYSTEM

CROSS-REFERENCE TO RELATED APPLICATIONS

Pursuant to 35 U.S.C. § 119 and the Paris Convention Treaty, this application claims foreign priority to Chinese Patent Application No. 202310394910.1 filed Apr. 13, 2023, the contents of which and any intervening amendments thereto are incorporated herein by reference.

TECHNICAL FIELD

The present disclosure relates to the field of laser device technologies, and in particular, to a sequential-pulse single-frequency laser power amplification apparatus and a sequence controllable multi-laser system.

BACKGROUND

Since the emergence of lasers in the 1960s, laser device-related technologies have developed rapidly. The laser is widely used in scientific research and industrial fields because of its excellent monochromaticity, coherence, and directivity. In some scientific experiments, for example, in the field of cold ion and cold atom quantum computing, it is required that the linewidth of a laser is relatively narrow, for example, with a magnitude of 10 Hz or even 0.1 Hz, and that phase noise within a carrier frequency of 2 MHz is relatively small, to ensure accuracy of quantum state operations. In addition, to ensure speedy quantum state operations, the laser power needs to be relatively high, reaching an intensity of $10^7$ W/m$^2$ or above. A laser with narrow linewidth and high power is costly. Significant loss occurs during frequency modulation, phase modulation, amplitude modulation, and optical path control (for example, the coupling efficiency of a single-mode polarization maintaining fiber is generally only 50% to 80%, and the first-order diffraction efficiency of an acousto-optic modulator is only 50% to 90%). As experimental platforms expand and experiment operations become more complex, the output power requirement for laser devices is also increasing. To perform an experiment, laser power of dozens or even hundreds of milliwatts is often necessary. Therefore, low-cost power amplification of laser power, especially for narrow-linewidth lasers, has a relatively more considerable cost advantage than repeatedly adding narrow-linewidth laser devices. When a laser is used in quantum computing, quantum communication, quantum sensing, and other fields, laser power amplification and operations such as frequency shifting, phase shifting, and sequence controlling are necessary. In the prior art, the apparatus of laser power amplification and the apparatus for operations are separate components that work independently. Generally, a seed laser emitted by a laser device must be amplified first, mainly using techniques like tapered amplifier (TA), injection locking, and traveling wave amplifier. The amplified seed laser is then modulated using acousto-optic modulator (AOM), electro-optic modulator (EOM), etc., for frequency shifting and sequence controlling. However, the disadvantage of this traditional approach is the significant power loss. This is because devices like acousto-optic modulators have a single-pass diffraction efficiency of about 50%-90%, and the laser power further reduces after a laser passes twice through the acousto-optic modulator. To adjust the laser frequency within a certain frequency range without changing the optical path, a double-pass acousto-optic modulator is usually required. Sometimes, to produce controllable amplitude sidebands in an output laser, an additional single-pass acousto-optic modulator is needed. In such cases, the transmission rate of the laser drops to about 35% to 75%, significantly reducing the efficiency of laser use.

SUMMARY

The present disclosure aims to solve prior art issues by providing a sequential-pulse single-frequency laser power amplification apparatus. The apparatus comprises a sequence control unit and a power amplification unit. The sequence control unit is configured to modulate the parameters of an incident source laser and control a sequence switch for the source laser, resulting in the production of a primary laser output. The power amplification unit is configured to amplify the power of the primary laser and output a secondary laser.

Further, the sequence control unit comprises a ½ wave plate, a polarization beam splitter, a first acousto-optic modulator, a ¼ wave plate, and a total reflection mirror that are disposed in sequence. The ½ wave plate is configured for deflecting a linear polarization direction of the source laser and outputting a first linearly polarized light; the polarization beam splitter is configured for transmitting the first linearly polarized light to the first acousto-optic modulator; the first acousto-optic modulator is configured for frequency shifting and sequence controlling for the first linearly polarized light, and emitting multi diffraction light beams; the multi diffraction light beams comprise a first-order diffraction light beam and a zero-order diffraction light beam; the sequence control unit further comprises an aperture for transmitting the first-order diffraction light beam to the ¼ wave plate, while shielding the zero-order diffraction light beam. The ¼ wave plate is configured for changing a linearly polarized light into a circularly polarized light, or changing a circularly polarized light into a linearly polarized light. Specifically, after the first-order diffraction light beam passes through the ¼ wave plate, a first circularly polarized light is formed and is emitted to the total reflection mirror. The total reflection mirror is configured to receive and reflect the first circularly polarized light, so as to generate a second circularly polarized light, wherein the second circularly polarized light is configured to pass through the ¼ wave plate, the aperture, and the first acousto-optic modulator in succession along an initial path before being redirected to the polarization beam splitter wherein the ¼ wave plate is further configured to turn the second circularly polarized light into a second linearly polarized light wherein a polarization direction of the second linearly polarized light is perpendicular to a polarization direction of the first linearly polarized light. The polarization beam splitter is further configured to receive and reflect the second linearly polarized light, so as to output the primary laser to the power amplification unit.

Further, the power amplification unit comprises an optical isolator and a laser diode; the optical isolator is configured for injecting the primary laser into the laser diode; the laser diode is configured to amplify a power of the primary laser, to output the secondary laser back to the optical isolator; and the optical isolator is further configured for restricting a propagation direction of the secondary laser, to prevent the secondary laser from being injected back into the laser diode.

Further, the parameters modulated by the sequence control unit include a frequency, a phase, and/or an amplitude of the source laser. The power amplification of the primary laser includes injection locking amplification, traveling wave amplification, and/or regenerative amplification.

The present disclosure further provides a sequential-pulse multi-frequency laser power amplification device comprising the foregoing sequential-pulse single-frequency laser power amplification apparatus. The sequential-pulse multi-frequency laser power amplification device further comprises a second acousto-optic modulator for modulating the secondary laser, wherein the second acousto-optic modulator is disposed on an output optical path of the power amplification unit, so as to generate a multi-frequency signal laser comprising a controllable sideband intensity.

Further, the second acousto-optic modulator further comprises an optical switch for turning off and on an optical path of the multi-frequency signal laser.

In addition, the present disclosure further provides a sequence controllable multi-laser system comprising the foregoing sequential-pulse multi-frequency laser power amplification device and/or the foregoing sequential-pulse single-frequency laser power amplification apparatus. The sequence controllable multi-laser system further comprises an ultra-narrow linewidth laser device providing an ultra-narrow linewidth pulse laser, and a plurality of beam splitters or a plurality of optical fibers for dividing the ultra-narrow linewidth pulse laser into a couple of beams. Each beam, serving as the source laser, is then directed towards one sequential-pulse single-frequency laser power amplification apparatus or one sequential-pulse multi-frequency laser power amplification device.

The technical solutions of the present disclosure have the following beneficial effects:

With the sequential-pulse single-frequency laser power amplification apparatus of the present disclosure, a single ultra-narrow linewidth laser can meet the requirements of multiple platforms. In the sequential-pulse single-frequency laser power amplification apparatus of the present disclosure, the sequence control unit for the primary laser is disposed in front of the power amplification unit for the secondary laser, allowing for outputting the secondary laser at the maximum power while maintaining all the frequency characteristics of the primary laser. In addition, as a laser that operates at a largely detuned frequency has no impact on an aimed atomic system, the final stage optical switch could be omitted for the sequential-pulse single-frequency laser power amplification apparatus. Thus, more than 15% of the laser power would be saved. Meanwhile, for the sequential-pulse multi-frequency laser power amplification device of the present disclosure, an optical switch can be applied to output a laser with multiple frequencies, although the optical power loss of approximately 15% cannot be inevitable. In summary, the structural arrangement of the sequence controllable multi-laser system of the present disclosure is simple and detachable, resulting in a stable output laser, low costs in construction and maintenance, and a potential promising application in the commercial market.

Other beneficial effects of the present disclosure are described in detail in the subsequent description of embodiments.

DESCRIPTIONS OF REFERENCE NUMERALS

1. Sequence control unit; 2. Power amplification unit; 3. Source laser; 4. Primary laser; 5. Secondary laser; 6. Multi-frequency signal laser; 7. Ultra-narrow linewidth pulse laser; 11. ½ wave plate; 12. Polarization beam splitter; 13. First acousto-optic modulator; 14. Aperture; 15. ¼ wave plate; 16. Total reflection mirror; 17. Second acousto-optic modulator; 21. Laser diode; 22. Optical isolator; 31. First linearly polarized light; 32. First circularly polarized light; 33. Second circularly polarized light; 34. Second linearly polarized light; 100. Ultra-narrow linewidth laser device; 101. Sequential-pulse single-frequency laser power amplification apparatus; 102. Sequential-pulse multi-frequency laser power amplification device; 103. Beam splitter; 104. Optical fiber.

DETAILED DESCRIPTION

To describe technical solutions in embodiments of the present disclosure more clearly, the following briefly describes accompanying drawings that need to be used in the description of embodiments. It is to be understood that the embodiments described herein are intended to explain the present disclosure only, not intended to limit the scope of the present disclosure.

According to the solutions provided in the embodiments, stable laser oscillation can be quickly established (the minimum establishing time is in the order of 10 ns). The difference in output laser frequencies, with or without a seed source, can reach tens of GHz or more. In the following embodiments, the sequential-pulse single-frequency laser power amplification apparatuses 101 are arranged in different manners for different application scenarios, which significantly improves the efficiency of laser power.

For different scenarios, descriptions are given as follows:

Embodiment 1

Figure 1:
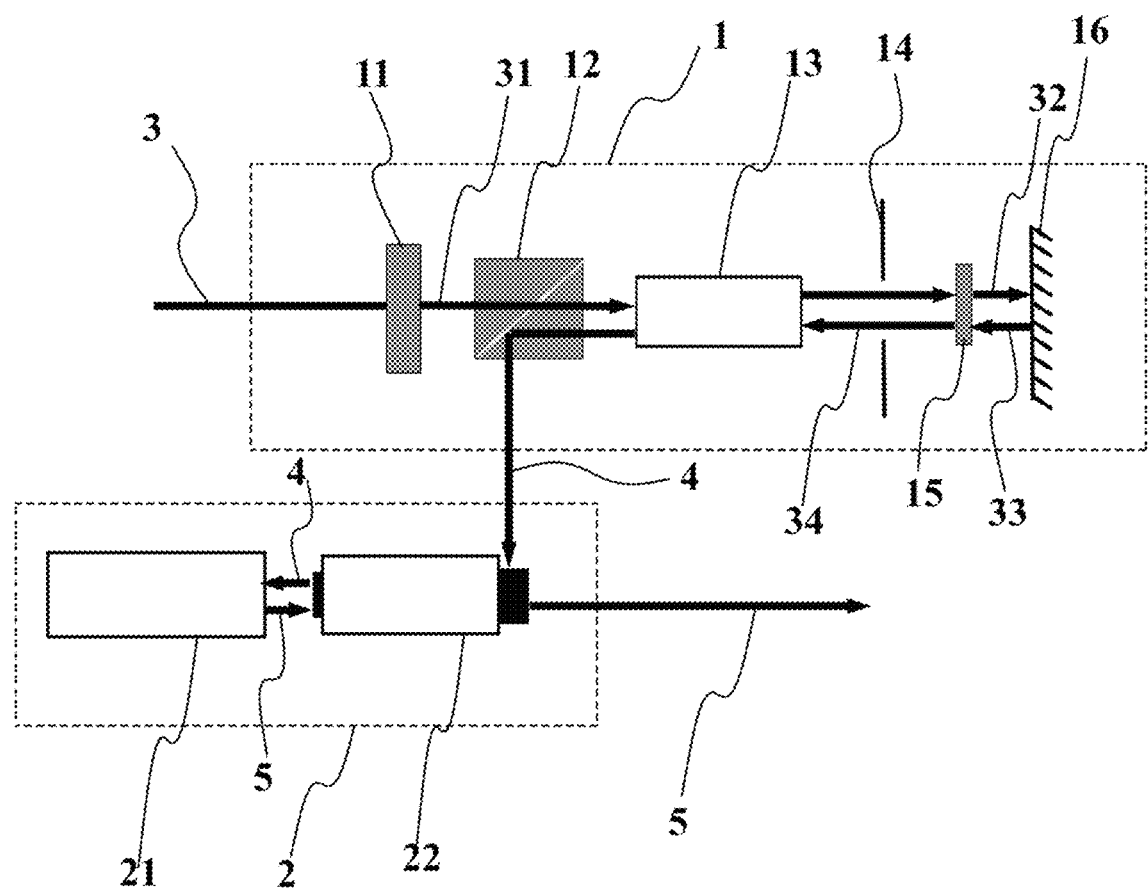
FIG. 1 is a schematic structural block diagram of a sequential-pulse single-frequency laser power amplification apparatus according to an embodiment of the present disclosure.

In cold atomic systems, a sequential-pulse single-frequency laser power amplification apparatus 101 can be built on an experiment platform, as demonstrated in FIG. 1, to provide single-frequency laser output, or for applications where frequency shifting and sequence controlling are required. The sequential-pulse single-frequency laser power amplification apparatus 101 comprises a sequence control unit 1 and a power amplification unit 2. The sequence control unit 1 is configured for modulating parameters of a source laser 3 and controlling a sequence switch of the source laser 3, so as to output a primary laser 4. The power amplification unit 2 is configured to amplify a power of the primary laser 4 to output a secondary laser 5. The parameters of the source laser 3 modulated by the sequence control unit 1 comprise a frequency, a phase, and/or an amplitude of the source laser 3. The power amplification for the primary laser comprises injection locking amplification, traveling wave amplification, and/or regenerative amplification.

The sequence control unit 1 comprises a ½ wave plate 11, a polarization beam splitter 12, a first acousto-optic modulator 13, an aperture 14, a ¼ wave plate 15, and a total reflection mirror 16 that are arranged in succession. The ½ wave plate 11 is configured to deflect a linear polarization direction of the source laser 3, to output a first linearly polarized light 31. The polarization beam splitter 12 is configured to receive and transmit the first linearly polarized light 31. The first acousto-optic modulator 13 is configured to shift a frequency of the first linearly polarized light 31 and is configured to control a timing sequence for the first linearly polarized light 31, so as to emit multi-diffraction light beams. In this embodiment of the present disclosure, the multi-diffraction light beams comprise a first-order diffraction light beam and a zero-order diffraction light beam. And the multi-diffraction light beams may also comprise other-order diffraction light beams in other embodiment of the present disclosure. The aperture 14 is configured for transmitting the first-order diffraction light beam while shielding the zero-order diffraction light beam. The ¼ wave plate 15 is configured for changing a linearly polarized light into a circularly polarized light, or changing a circularly polarized light into a linearly polarized light. After the first-order diffraction light beam passes through the ¼ wave plate 15, a first circularly polarized light 32 is formed and is emitted to the total reflection mirror 16. The total reflection mirror 16 is configured to receive and reflect the first circularly polarized light 32, thus emitting a second circularly polarized light 33. In this embodiment of the present disclosure, the second circularly polarized light 33 is configured to pass through the ¼ wave plate 15, the aperture 14, and the first acousto-optic modulator 13 in succession, back along an optical path of the first circularly polarized light 32. In other embodiments of the present disclosure, the aperture 14 is not included. Further, the ¼ wave plate 15 is configured to turn the second circularly polarized light 33 into a second linearly polarized light 34, which is oriented perpendicularly to the polarization direction of the first linearly polarized light 31. The polarization beam splitter 12 is further configured to receive and reflect the second linearly polarized light 34, so as to output the primary laser 4 to the power amplification unit 2. In other words, the primary laser 4 is the second linearly polarized light 34 emitted out from the polarization beam splitter 12. In some other embodiments of the present disclosure, the polarization beam splitter 12 may be configured for reflecting the first linearly polarized light 31 and transmitting the second linearly polarized light 34, so that propagation directions of the first linearly polarized light 31 and the second linearly polarized light 34 are perpendicular to each other. In addition, in an embodiment of the present disclosure, multiple ½ wave plates 11 or other polarizers may be further added in front of the polarization beam splitter 12, so as to increase or purify the degree of linear polarization of the first linearly polarized light 31.

The power amplification unit 2 comprises an optical isolator 22 and a laser diode 21. The optical isolator 22 is configured to inject the primary laser 4 into the laser diode 21. The laser diode 21 is configured to power amplify the primary laser 4 and is configured to output the secondary laser 5 back to the optical isolator 22. In an embodiment of the present disclosure, stable laser oscillation can be quickly established using an injection-locked amplifier (the minimum establishing time is in the order of 10 ns), and the difference in frequencies of the secondary lasers 5, with or without the primary laser 4, can reach tens of GHz or more. In some other embodiments of the present disclosure, the power of the primary laser 4 may be amplified by traveling wave amplification or regenerative amplification. In an embodiment of the present disclosure, the optical isolator 22 is further configured to restrict a propagation direction of the secondary laser 5 to prevent the secondary laser 5 from being injected back into the laser diode 21 in reverse.

The maximum output power of the secondary laser 5 can reach the maximum power of the primary laser 4, the linewidth and the noise characteristic of the secondary laser 5 can be consistent with those of the primary laser 4, and the output power of the secondary laser 5 is immune to the power of the primary laser 4. When the primary laser 4 is cut off, the secondary laser 5 is still on, having a frequency greatly detuned from the atomic frequency. That is, without the injection of the primary laser 4, the laser diode 21 outputs a laser that operates freely. In this case, the frequency of the secondary laser 5 differs greatly from the atomic frequency and the resonance is inactivated. In other words, a detuned laser beam will not interact with an atomic system and thus has no effect on the experimental result. Therefore, in this embodiment of the present disclosure, by switching on/off the primary laser 4, the frequency of the emitted secondary laser 5 can be controlled to resonate with the atomic frequency or not, and laser operations can be enabled or disabled to complete scientific experiments. The technical solution provided in this embodiment of the present disclosure can make full use of the power of the primary laser 4.

Embodiment 2

Figure 2:
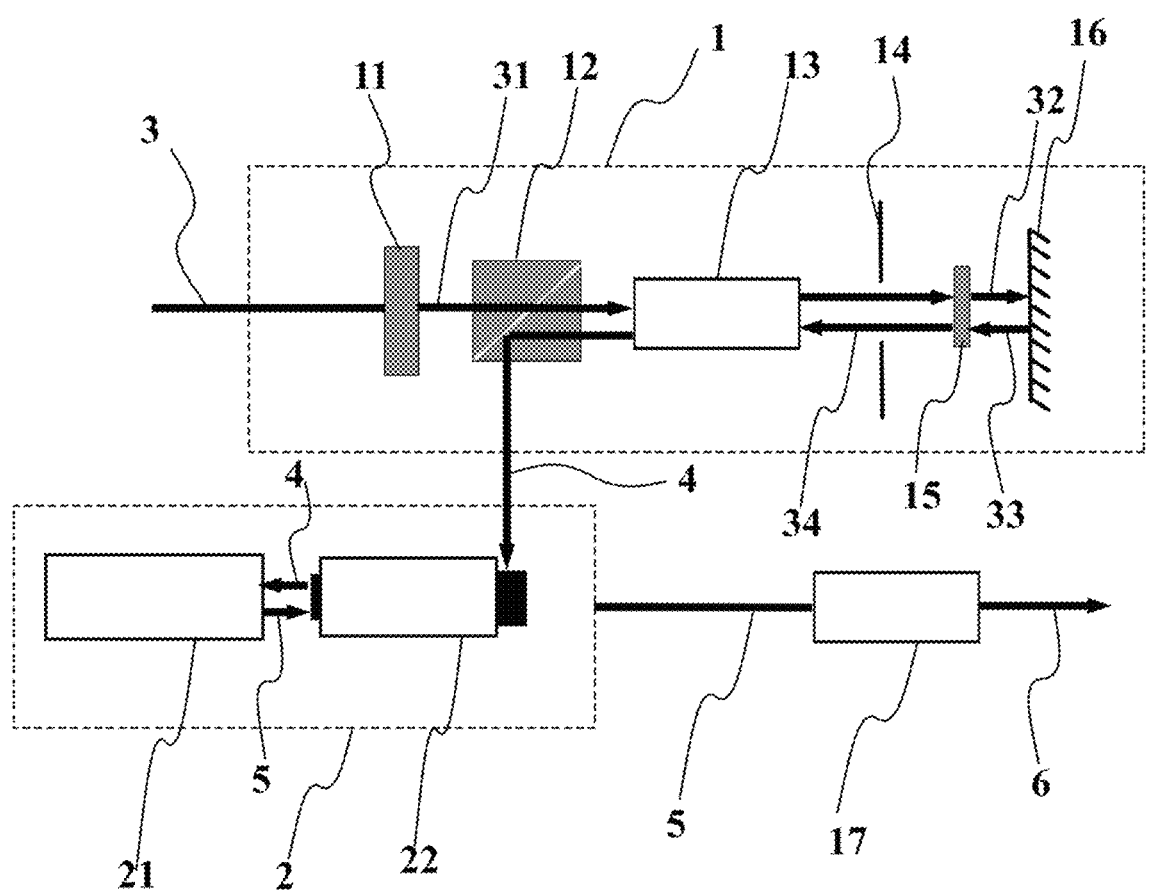
FIG. 2 is a schematic structural block diagram of a sequential-pulse multi-frequency laser power amplification device according to an embodiment of the present disclosure.

In cold atomic systems, a sequential-pulse multi-frequency laser amplification device can be built, as demonstrated in FIG. 2, to provide multiple frequency components for interacting with atoms, or for applications where frequency shifting and sequence controlling are required. FIG. 2 is a schematic structural block diagram of a sequential-pulse multi-frequency laser amplification device according to an embodiment of the present disclosure. As demonstrated in FIG. 2, on the basis of Embodiment 1, before entering the experimental platform, the secondary laser 5 needs to pass through a second single-pass acousto-optic modulator 17. The second acousto-optic modulator 17 is configured for modulating the secondary laser 5 to form a multi-frequency signal laser 6 having a controllable sideband intensity, the second acousto-optic modulator 17 being disposed on an output optical path of the power amplification unit 2. That is, multi-frequency signal modulation is performed on a drive signal for the second acousto-optic modulator 17, so as to prevent the multi-frequency laser from being injected into a laser diode to cause non-linear frequency mixing, thereby avoiding the formation of high-order sidebands. In Embodiment 2, the second acousto-optic modulator 17 further comprises an optical switch, by which an optical switch modulation signal can be applied to turn off and on the optical path of the multi-frequency signal laser 6. Compared with Embodiment 1, Embodiment 2 further reduces the possible impact caused by a laser that operates at a largely detuned frequency and increases the stability of laser output, e.g., the impact of ac Stark frequency on precision measurement experiments. In Embodiment 2 of the present disclosure, the output power can reach 70%-90% of the maximum power of the primary laser 4.

It is to be noted that multi-frequency means that the application scenario requires a multi-frequency laser, so dual-frequency modulation needs to be performed on a single-frequency laser. For example, two optical beams with a frequency difference of $\omega$ need to be combined. In a conventional amplification apparatus, a dual-frequency laser is injected into the laser diode 21 as a seed laser (the primary laser 4) and amplified by injection locking. When frequency components in the multi-frequency laser are close to each other (i.e., the adjacent frequency difference $\omega$<20 MHz), more sidebands of higher orders with intervals of $\omega$ would appear in the amplified secondary laser 5, sometimes as many as six sidebands. Excessive frequency components can be detrimental to physical experiments. Embodiment 2 of the present disclosure resolves the above problem by placing the working unit that generates multi-frequency laser through modulation behind the power amplification unit 2.

Embodiment 3

Figure 3:
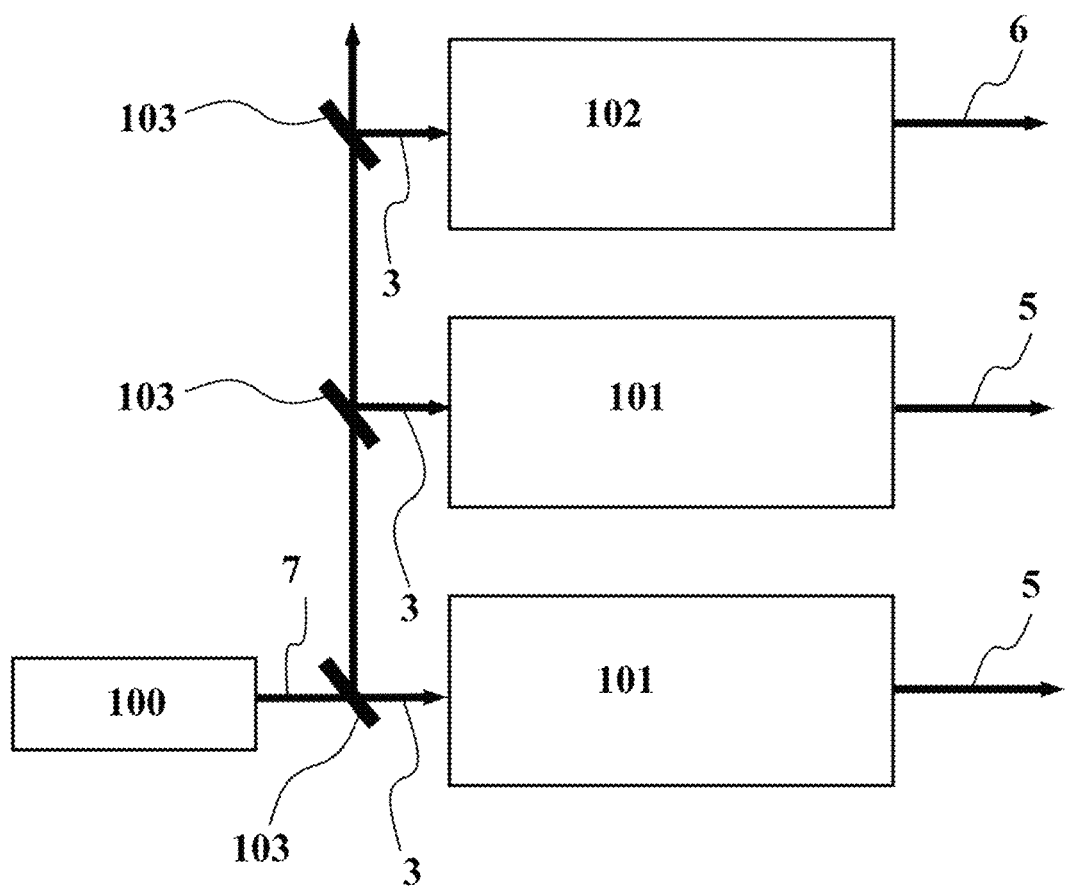
FIG. 3 is a structural block diagram of a sequence controllable multi-laser system according to an embodiment of the present disclosure.
Figure 4:
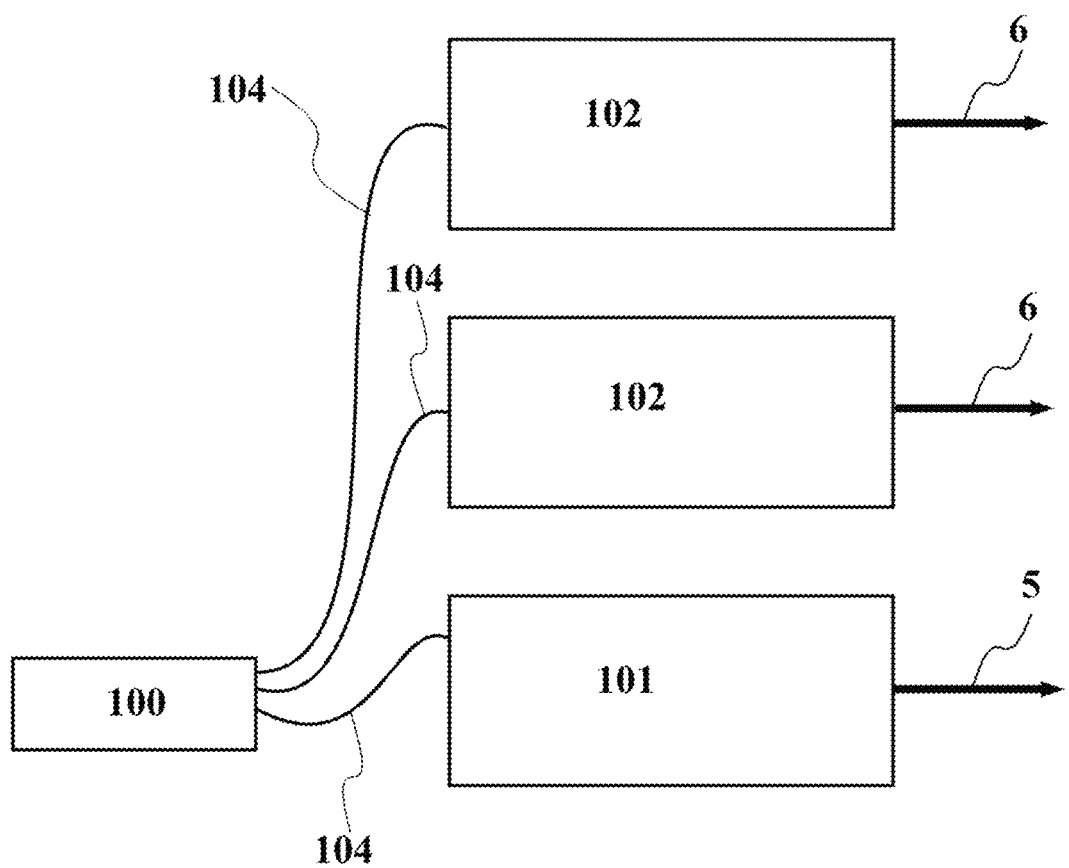
FIG. 4 is a structural block diagram of another sequence controllable multi-laser system according to an embodiment of the present disclosure.

Referring to FIG. 3, the present disclosure provides a sequence controllable multi-laser system. FIG. 4 illustrates another sequence controllable multi-laser system according to an embodiment of the present disclosure. In the embodiments as demonstrated in FIG. 3 and FIG. 4, the sequence controllable multi-laser system comprises the sequential-pulse single-frequency laser power amplification apparatus 101 and the sequential-pulse multi-frequency laser power amplification device 102. In some other embodiments of the present disclosure, the sequence controllable multi-laser system comprises only the sequential-pulse single-frequency laser power amplification apparatus 101, or only the sequential-pulse multi-frequency laser power amplification device 102, or any combination thereof. In an embodiment of the present disclosure, the sequence controllable multi-laser system further comprises an ultra-narrow linewidth laser device 100 providing an ultra-narrow linewidth pulse laser 7, and a plurality of beam splitters 103 or a plurality of optical fibers 104 for dividing the ultra-narrow linewidth pulse laser 7 into a couple of beams 3. It is to be noted that the beam splitter 103 and the optical fiber 104 in the sequence controllable multi-laser system provided in this embodiment of the present disclosure cannot co-exist. In an embodiment of the present disclosure, as demonstrated in FIG. 3, two beams are respectively incident into two sequential-pulse single-frequency laser power amplification apparatuses 101, and one beam is incident into one sequential-pulse multi-frequency laser power amplification device 102. As demonstrated in FIG. 4, two beams are respectively incident into two sequential-pulse multi-frequency laser power amplification devices 102, and one beam is incident into one sequential-pulse single-frequency laser power amplification apparatus 101. In some other embodiments of the present disclosure, the number of beam splitters 103 or optical fibers 104, the number of sequential-pulse single-frequency laser power amplification apparatuses 101, and the number of sequential-pulse multi-frequency laser power amplification devices 102 can be arbitrarily selected.

It is to be noted that the ultra-narrow linewidth laser device 100 used in this embodiment of the present disclosure has a narrow linewidth (10 Hz or below) and low phase noise (lower than −60 dBm). The beam splitter 103 divides the ultra-narrow linewidth pulse laser 7 into multiple beams each serving as the source laser 3. Alternatively, the ultra-narrow linewidth pulse laser may be distributed to multiple platforms using optical fibers 104.

Based on the above, in the embodiments of the present disclosure, a single ultra-narrow linewidth laser 100 can meet the requirements of multiple platforms. The sequence control unit for the primary laser 4 is disposed in front of the power amplification unit 2 for the secondary laser 5, allowing for outputting the secondary laser 5 at the maximum power while maintaining all the frequency characteristics of the primary laser 4. The structure of the sequence controllable multi-laser system of the present disclosure is simple and detachable, resulting in a stable output laser, low costs in construction and maintenance, and a potential promising application in the commercial market. In the technical solution of Embodiment 1, as a laser that operates at a largely detuned frequency has no impact on an aimed atomic system, the final stage optical switch could be omitted for the sequential-pulse single-frequency laser power amplification apparatus. Thus, more than 15% of the laser power would be saved. In the technical solution of Embodiment 2, an optical switch can be applied to output a laser with multiple frequencies, although the optical power loss of approximately 15% cannot be inevitable.

The effects of the present disclosure are assessed through the following experiments.

Under experimental conditions, excitation spectra of single-ion are used to compare the noise in the primary laser 4 with the noise in the injection-locked pulse laser. If there is any noise present, it will be observed as peaks corresponding to the noise band in the excitation spectrum. As can be seen from the excitation spectrum of the primary laser 4 and the excitation spectrum of the injection-locked pulse laser, there is substantially no noise difference between the technical solution of the present disclosure and conventional approaches.

To determine the time response and frequency following performance of a sequential-pulse laser after injection locking, a test optical path is additionally built in the embodiments of the present disclosure. In the test optical path in the embodiments of the present disclosure, the source laser 3 is divided into two beams. One beam of the source laser 3 is modulated by the first acousto-optic modulator 13 and then is injected into the laser diode 21 through the optical isolator 22 for injection locking, and the secondary laser 5 is split by the beam splitter 103 into multiple beams, part of which is used as a beat signal for testing its locking function. The other beam of the source laser 3, serving as a reference signal, is combined with the beat signal through a 45-degree total reflection mirror 16 and a semi-transmissive semi-reflective mirror, for detecting the beat frequency. In the test optical path in the embodiments of the present disclosure, a high-speed photoelectric detector is used to detect the beat frequency between the source laser 3 and the secondary laser 5. When the laser frequency and phase are locked, a sinusoidal signal having a stable amplitude and phase appears on the photoelectric detector, the frequency of the sinusoidal signal being consistent with that of a drive signal for the first acousto-optic modulator 13. The test result is displayed and recorded using a 500 MHz oscilloscope. A signal generator is configured for controlling on/off, frequency shift, and laser power of the first acousto-optic modulator 13. Turning off the signal generator will cut off the primary laser 4, and turning on the signal generator will produce the primary laser 4. Upon injecting the primary laser 4, the secondary laser 5 is locked to the required laser frequency. When the signal generator is turned off, the secondary laser 5 that is output operates freely. Because the frequency difference between the source laser 3 and the secondary laser 5 operating freely is in the order of 10 GHZ, the photoelectric detector fails to respond, and the beat signal is a direct-current signal. In an embodiment of the present disclosure, the frequency shift of the first acousto-optic modulator 13 is 100 MHZ, and a 200 MHz high-speed photoelectric detector may be used for testing.

In the present disclosure, the time required for completion of injection locking is obtained by measuring the time from laser injection to establishment of a stable beat signal. A signal source is turned on, and the time from turning on of the signal source to output of a first-order diffraction light beam from the first acousto-optic modulator 13 is measured, that is, which is defined as a turn-on time t0 of the first acousto-optic modulator 13. The time from turning on the signal source to the establishment of the stable beat signal is defined as t1. The time required from injection of the primary laser 4 to establishment of stable oscillation can be obtained by subtracting t0 from t1.

Figure 5:
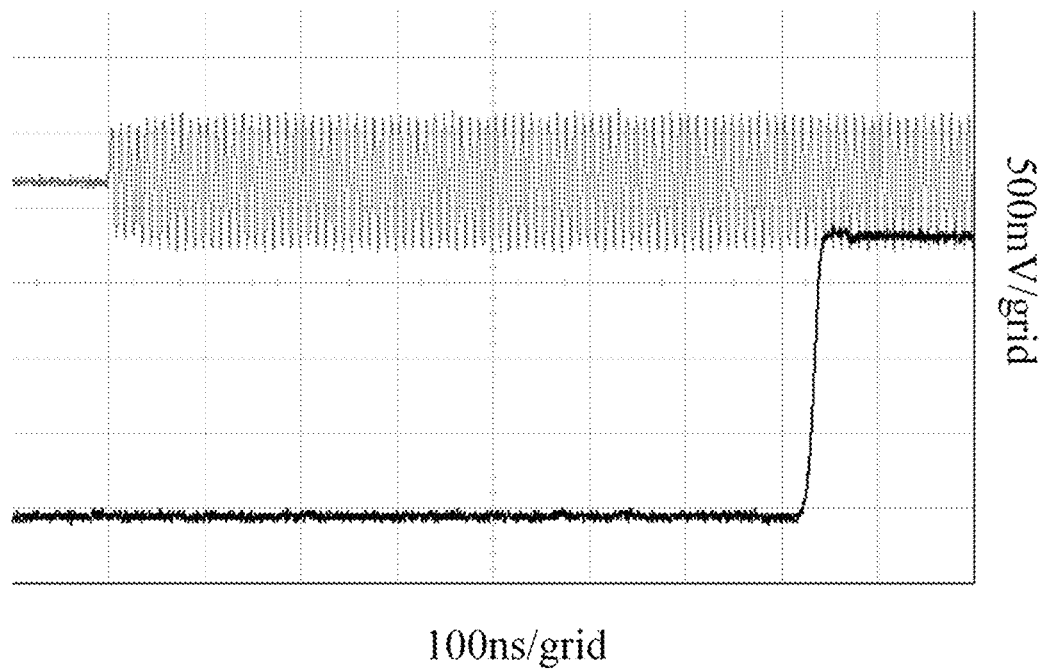
FIG. 5 illustrates a time response of the first acousto-optic modulator to a drive signal, with data sourced from a test according to an embodiment of the present disclosure.
Figure 6:
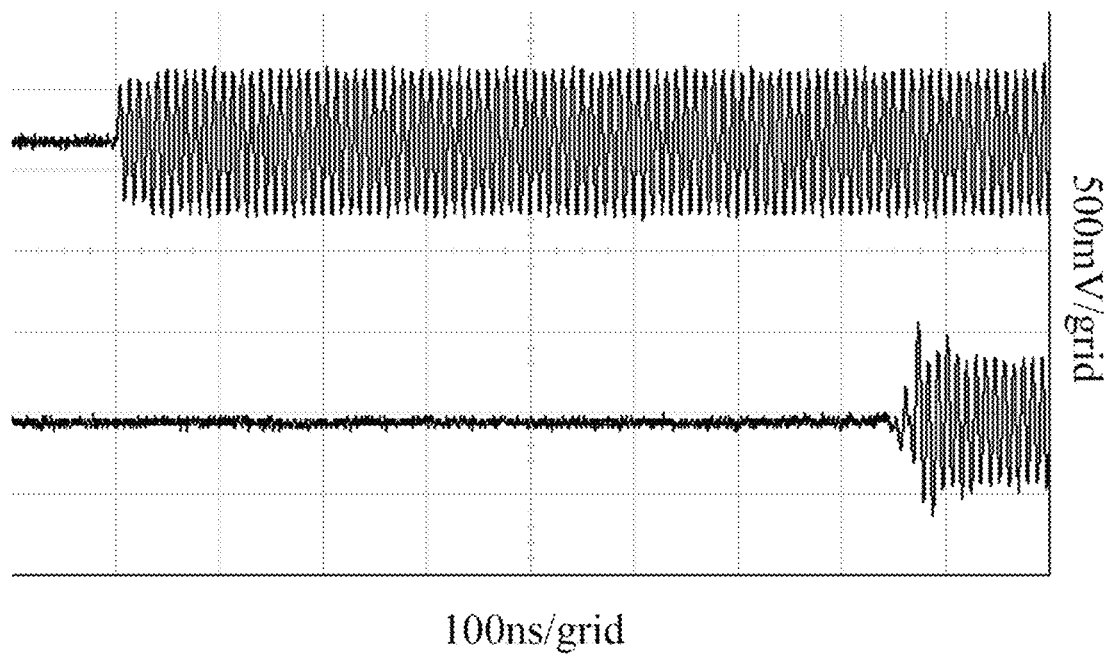
FIG. 6 illustrates a time response of the first acousto-optic modulator from its activation to the establishment of a stable injection locking oscillation signal, with data sourced from a test according to an embodiment of the present disclosure.
Figure 7:
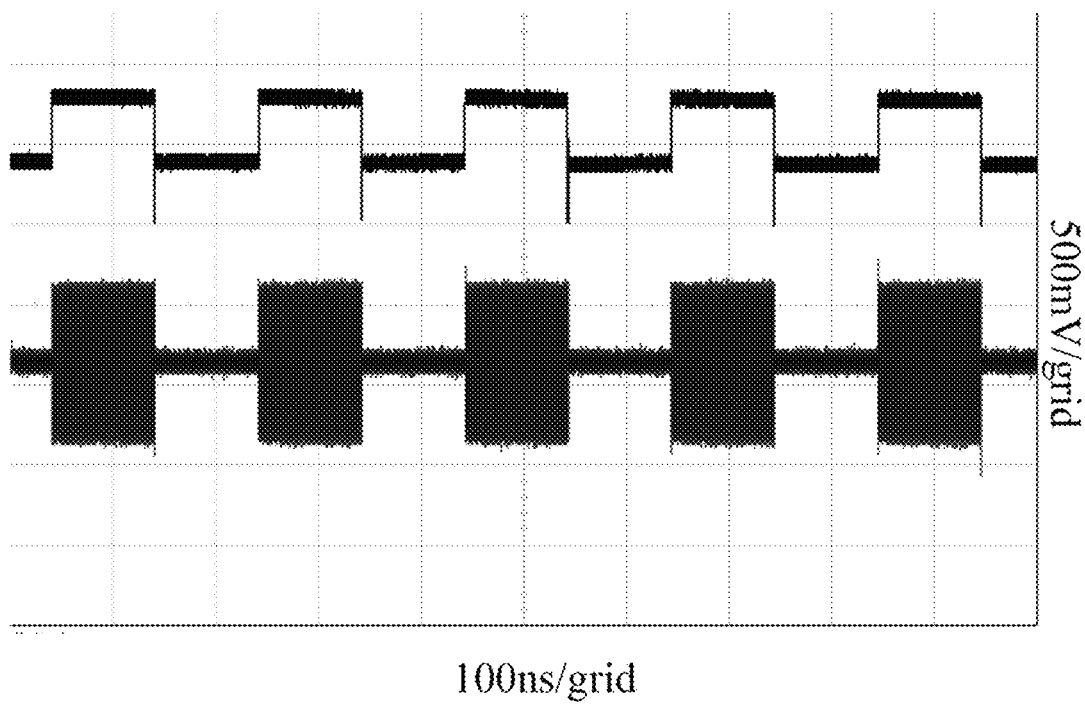
FIG. 7 illustrates a time response of the first acousto-optic modulator when outputting an injection locking signal after sequence control, with data sourced from a test according to an embodiment of the present disclosure.

Data sourced from the lasers is demonstrated in FIG. 5 to FIG. 7. The turn-on time t0 of the first acousto-optic modulator 13 is measured based on FIG. 5, the time t1 is measured based on FIG. 6, and the laser locking speed is calculated based on t0 and t1. FIG. 7 illustrates a time response of the first acousto-optic modulator when outputting an injection locking signal after sequence control. Descriptions are given below with reference to FIG. 5 to FIG. 7, respectively.

FIG. 5 illustrates a time response of the first acousto-optic modulator 13 to a drive signal. The diagram in FIG. 5 shows two channels. The top line channel indicates the process of the signal generator turning on. When turned off, the signal generator does not output any signal. After turned on, the signal generator outputs a 100 MHz alternating-current signal. The bottom line channel represents the delay of the output of the first-order diffraction light beam emitted from the first acousto-optic modulator 13 relative to the driving signal on the signal generator, i.e., the turn-on time of the first acousto-optic modulator 13. The turn-on delay of the first acousto-optic modulator 13 varies with the crystal size and the light spot size. A high-speed switch is selected, so that the first acousto-optic modulator 13 can implement switching for a laser within as short as 10 ns. This parameter is not of interest to the present disclosure. The time required from an injection of the seed laser into the laser diode 21 to the locking of the output laser to the phase of the seed laser phase is of interest to the present disclosure. The test result shows that the time to from turning on of the signal generator to the output of the modulated laser from the first acousto-optic modulator 13 is 726 ns.

FIG. 6 illustrates a time response of the first acousto-optic modulator 13 from its activation to the establishment of a stable injection locking oscillation signal. The diagram in FIG. 6 shows two channels. The top line channel indicates the process of the signal generator turning on, while the bottom line channel represents the response of the first acousto-optic modulator to the signal generator after injection locking. The test result shows that the establishment of a stable injection locking oscillation signal occurs 790 ns later than the moment at which the signal generator is turned on. By comparing FIG. 5 and FIG. 6, it can be found that the time required from the injection of the secondary laser 5 to the completion of injection locking is very short, which is about 64 ns and is much shorter than that required in an atomic physical experiment (generally, several microseconds to several hundred microseconds).

FIG. 7 illustrates a time response of the first acousto-optic modulator 13 when outputting an injection locking signal after sequence control. The diagram in FIG. 7 shows two channels. The top line channel represents a sequence signal (which is output at a high level or a low level by a field programmable gate array (FPGA) controlled by a computer), for controlling on and off of the first acousto-optic modulator 13, wherein the low level means turning off the first acousto-optic modulator 13. The high level means turning on the first acousto-optic modulator 13. The bottom line channel represents a beat signal. The result shows that injection locking can quickly follow the laser sequence signal.

It is to be noted that the ultra-narrow linewidth laser device 100 in the embodiments is a Pound-Drever-Hall (PDH) frequency stabilization system built using a laser device and an ultra-stable optical cavity from related manufacturers. It can be determined through laser-atom interaction that the wavelength of the laser is 729 nm, and the linewidth of the laser is about 20 Hz. A relative value of the noise level can be observed from the spectrum of an error signal by the PDH frequency stabilization system, with single-frequency noise of 82 kHz and 164 kHz present. The optical elements (comprising the beam splitter 103, the total reflection mirror 16, the semi-transmissive semi-reflective mirror, the polarization beam splitter 12, the ½ wave plate 11, the ¼ wave plate 15, etc.) are customized parts, which do not increase the laser linewidth or generate noise. The first acousto-optic modulator 13 is of the model MT110-A1-IR, which also does not increase the laser linewidth or generate noise. The laser diode 21 is of the model HL7302MG, which operates freely with an output power of 40 mW and usually a drive current of 100 mA and has no impact on linewidth and noise. The optical isolator 22 is of the model ISO730-3-1.5W, which provides an isolation effect only and has no impact on laser linewidth and spectral noise. The signal generator is of the model DG4162, configured for signal output. The sequence signal is output from a self-developed FPGA circuit controlled by a computer.

It is to be noted that the detailed description is used for describing the technical solutions of the present disclosure only and is not intended to limit the scope of the present invention. It is to be understood by those of ordinary skill in the art although the present disclosure is described in detail with reference to the embodiments, any modification or equivalent replacement made to the technical solutions of the present disclosure without departing from the spirit and scope of the technical solutions of the present disclosure shall fall within the scope of the appended claims.

What is claimed is:

1. A sequential-pulse single-frequency laser power amplification apparatus applied for an atomic system, comprising a sequence control unit and a power amplification unit, wherein the sequence control unit is configured to modulate parameters of an incident source laser and control a sequence switch for the source laser, for generating a primary laser; and the power amplification unit is configured to power amplify the primary laser, to generate a secondary laser; wherein when the primary laser is incident into the power amplification unit, the secondary laser resonates with the atomic system; when the power amplification does not have the primary laser injected, the secondary laser is detuned from the atomic system;

the sequence control unit comprises a ½ wave plate, a polarization beam splitter, a first acousto-optic modulator, a ¼ wave plate, and a total reflection mirror disposed in sequence;

the ½ wave plate is configured to deflect a linear polarization direction of the source laser, for generating a first linearly polarized light;

the polarization beam splitter is configured to transmit the first linearly polarized light to the first acousto-optic modulator;

the first acousto-optic modulator is configured to shift frequencies of the first linearly polarized light, control timing sequence for the first linearly polarized light, and emit a first-order diffraction light beam to the ¼ wave plate;

the ¼ wave plate is configured to turn the first-order diffraction light beam into a first circularly polarized light;

the total reflection mirror is configured to receive and reflect the first circularly polarized light, so as to emit a second circularly polarized light, wherein the second circularly polarized light is configured to pass through the ¼ wave plate and the first acousto-optic modulator in succession along an initial path wherein the ¼ wave plate is further configured to turn the second circularly polarized light into a second linearly polarized light wherein a polarization direction of the second linearly polarized light is perpendicular to a polarization direction of the first linearly polarized light; and the polarization beam splitter is further configured to receive and reflect the second linearly polarized light, so as to output the primary laser to the power amplification unit.

2. The sequential-pulse single-frequency laser power amplification apparatus of claim 1, wherein the power amplification unit comprises an optical isolator and a laser diode;

the optical isolator is configured to inject the primary laser into the laser diode;

the laser diode is configured to power amplify the primary laser, so as to output the secondary laser to the optical isolator; and the optical isolator is further configured to limit a propagation direction of the secondary laser, so as to prevent the secondary laser from being injected back into the laser diode.

* * * * *